United States Patent Office 3,686,046
Patented Aug. 22, 1972

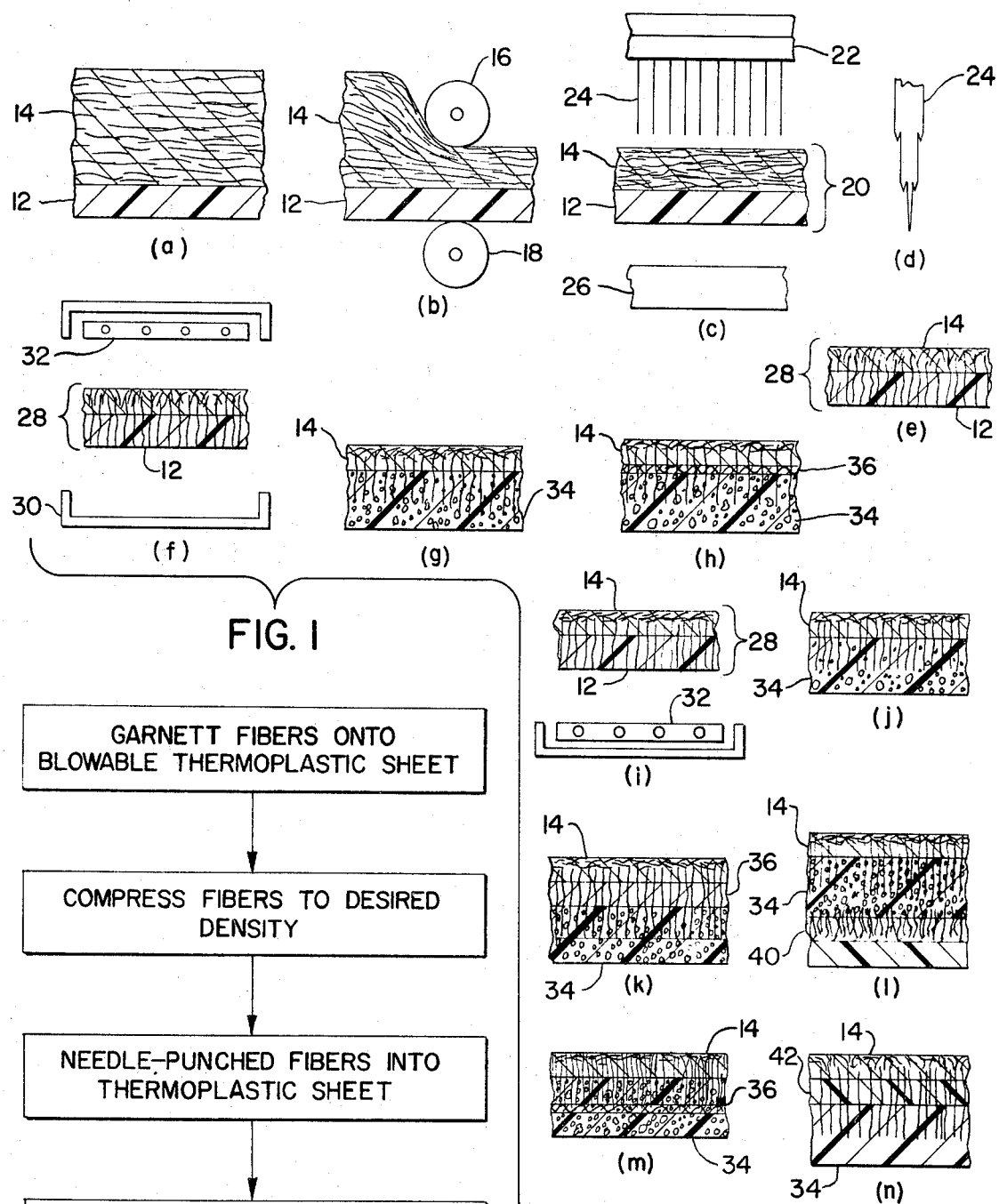

3,686,046
METHOD OF PRODUCING A NEEDLE PUNCHED NON-CELLULAR BACKED CARPET
Richard P. Crowley, Wellesley Hills, Mass.
(125 High St., Boston, Mass. 02110)
Filed Oct. 30, 1969, Ser. No. 872,498
Int. Cl. B32b 5/19
U.S. Cl. 156—72                      12 Claims

ABSTRACT OF THE DISCLOSURE

An improved needle-punched non-woven cellular backed laminate such as a carpet by garnetting overlapping layers of non-woven fibers onto a blowable thermoplastic sheet material; compressing the non-woven fibers to a desired density and thickness on the sheet material; needle punching the non-woven fibers directly into the blowable thermoplastic sheet material; and heating the needle-punched sheet laminate to form a thermoplastic cellular sheet material with a covering of needle-punched non-woven fibers secured to the cellular sheet.

BACKGROUND OF THE INVENTION

Non-woven carpets and other non-woven laminate sheet materials are often now prepared by needle punching a non-woven compressed layer of fibers into a fabric-type backing sheet of scrim which backing often contains fibrous waste material. The needle-punched non-woven fibers are usually bonded by applying a layer of adhesive latex to the backing material subsequent to the needle punching operation. Thereafter as desired such carpets may acquire a cellular base by bonding a layer of cellular sheet material such as a urethane or vinyl foam to the carpet backing. The process of preparing such carpets therefore requires several distinct and separate operative steps. Such carpets are often not wholly satisfactory as regards wear resistance and pilling characteristics due to the tendency of the non-woven fibers to be less than securely bonded to the backing sheet of the scrim and waste material. On the higher priced carpets where a cellular backing sheet is employed, an addition step is involved in bonding the cellular material to the back of the waste material or scrim. Accordingly, there is a need for a process to prepare in a rapid, simple and economic manner a cellular-backed non-woven carpet or sheet laminate.

SUMMARY OF THE INVENTION

My invention relates to and is concerned with a direct, simple, inexpensive method of preparing non-woven needle-punched cellular-backed sheet materials such as: floor, wall and upholstery coverings such as carpets; backing materials; garment material and the like and to the materials so prepared. In particular, my method is directed to the preparation of carpets and rugs wherein a non-woven needle-punched fabric is securely fastened and bonded to a thermoplastic cellular backing sheet.

The improved needle-punched non-woven cellular sheet products of my invention are prepared by applying a layer of non-woven fabric onto one surface of a gas-expandable polymeric sheet material; needle punching the non-woven fabric directly onto and into the sheet material; and heating the non-woven needle-punched polymeric sheet laminate to a temperature sufficient to expand the polymeric sheet and form a cellular sheet thereby producing in a simple, direct, inexpensive manner a product wherein the non-woven fabric is securely and directly bonded to a cellular sheet. In particular, my invention is directed to the preparation of an improved indoor-outdoor carpet prepared by:

(a) Providing a gas-expandable flexible thermoplastic sheet containing a chemical blowing agent;
(b) Garnetting overlapping layers of a non-woven synthetic fiber onto one surface of the thermoplastic sheet to a desired density and thickness;
(c) Compressing the non-woven garnetted fibers on the thermoplastic sheet to a desired density and thickness;
(d) Needle punching the compressed non-woven synthetic fibers into the thermoplastic sheet to secure the fibers thereto; and
(e) Heating the needle-punched thermoplastic sheet to a temperature sufficient to decompose the chemical blowing agent in the thermoplastic sheet and to form a cellular thermoplastic sheet material of my invention.

BRIEF DESCRIPTION OF THE DRAWINGS

FIG. 1(a–g) represents a fragmentary enlarged schematic illustration of the steps of preparing a cellular-backed indoor-outdoor carpet by my method.
FIG. 1(h–m) represents modifications to the method of preparing the cellular-backed carpet of FIG. 1(a–g).
FIG. 2 is a schematical block flow diagram of my method.

DESCRIPTION OF THE EMBODIMENTS OF MY INVENTION

My method and the product produced thereby will be described in particular with reference to the preparation of a non-woven synthetic needle-punched fiber cellular carpet material. FIG. 1(a) shows a gas-expandable polymeric sheet 12 on the upper surface of which has been applied a fluffy light layer of non-woven fibers 14. Sheet 12 may typically comprise a gelled cast or a calendered plasticized vinyl chloride, solid resin sheet containing a small amount of a chemical blowing agent such as from about 0.5 to 20 parts of a blowing agent like azodicarbonamide per hundred parts of the resin. Such vinyl chloride resin sheet material is flexible and resilient and may have a thickness of from 10 to 350, e.g. 50 to 200 mils or more depending upon the thickness of the subsequent cellular sheet desired. Such vinyl chloride and other thermoplastic resin sheets may be prepared in a manner set forth in U.S. Pat. 2,964,799, issued Dec. 20, 1960, hereby incorporated by reference. The non-woven fiber 14 is generally applied to the surface of the sheet by a garnetting machine whereby overlapping layers of a chopped fluffy non-woven fiber is laid on the sheet to the desired depth and density typically from 2 to 6 inches depending upon the final depth and density desired of the non-woven face of the carpet. Typical non-woven fibrous material 14 which may be employed include those non-absorbtive, non-staining weather-proof synthetics fibers composed of olefinic resins like polyethylene, polypropylene, ethylene-propylene copolymers and the other homo and copolymers of $C_2$–$C_4$ olefins.

FIG. 1(b) illustrates the compaction of the non-woven layer 14 on the sheet material 12 by the use of a pair of rollers 16 and 18 to compress the light fluffy layer 14 to a desired thickness and density for the next needle punching operation. Typically, the layer 14 is reduced in thickness from 50 to 90% to form the sheet laminate 20. Reduction in thickness of the layer 14 is recommended, since otherwise the light fluffy layer is difficult to handle in its original garnetted layer form, while compaction tends to improve the efficiency of the subsequent needle punching operation.

FIG. 1(c) illustrates the needle punching of the sheet laminate 20 by the use of a male die 22 containing a plurality of steel tapered barbed needles 24 projecting from the face of the die with a female die 26, in receiving position opposite the male die 22. The needle 24 often employed in needle punching operations is a thin tapered steel needle containing a plurality of barbs at its lower end, the barbs pointing downward so as to catch the non-woven fibers in the barbs and to force them into the flexible and resilient and plasticized sheet 12 during the rapid downward motion of the male die 22. The needle punching operation is carried out by the rapid reciprocating vertical movement of the male die 22 with the needles 24 and for a period of time sufficient so that the non-woven fibers in sufficient numbers are forced into the sheet 12. The needle punching step may be carried out a number of times with the same or different type needles at each step until the desired density and binding is attained. The needles punching operation further compacts the compressed layer 14 and secures it to the sheet 12. The use of a flexible plasticized resilient thermoplastic sheet is advantageous, since on the withdrawal of the needle, the non-woven fiber forced by the needle into the needle hole is retained in place by the compression set of the plastic flowing back around the fiber so that flexible plastic sheets are particularly useful in comparison to a rigid non-flowable plastic sheet material.

FIG. 1(e) shows the needle-punched material 14 with a plurality of fibers therein forced generally vertically into the thermoplastic sheet 12 to form a sheet laminate 28. FIG. 1(f) illustrates the heating of the sheet laminate 28 in a hot air oven often assisted by the use of an infrared heater 32 whereupon the sheet material 12 is heated to a temperature sufficient now to decompose the chemical blowing agent contained therein either wholly or partially and to form a cellular layer. FIG. 1(g) illustrates the product produced by heating the sheet laminate 28 wherein the non-woven needle-punched fibrous material forms a face coating for the carpet material while its fibers are fused and bonded to the cellular layer 34 produced by the decomposition of the chemical blowing agent. The indoor-outdoor carpet thus produced by my method is shown in FIG. 1(g) in its simplest form whereby the carpet has nonstaining synthetic non-woven fiber 14 which has been needle-punched into a solid thermoplastic resin material and on a subsequent blowing to form the cellular backing sheet 34 the needle-punched fibers remain directly secured to the foam material. Where desired, the foam material 34 produced may be of the closed or open-cell type. The open-cell type comprises a plurality of small cells all substantially interconnected so as to form a gas-breathable cellular layer which is particularly useful where the sheet laminate produced by my method is to be employed in garments. The non-woven fabric 14 is schematically fragmentarily illustrated as penetrating the cellular layer 34, the degree of penetration, of course, would depend on the needle punching operation. Where enhanced wear resistance of the face of the carpet is desired and an improved pilling desired, then an adhesive material such as a latex may be applied to the open-cell backing of the cellular layer 34 so that the latex may penetrate the open cells and upon a subsequent drying operation be cured and thereby aid in bonding the needle-punched fibers to the cellular layer 34.

FIG. 1(h) illustrates a product prepared by my invention in which a woven fabric or scrim material 36 is placed on the surface of the sheet material 12 or bonded thereto if desired, so that upon the needle punching the woven fabric 14 the fibers are forced through the woven fabric material 36 into the sheet material 12 to provide a more stable sheet laminate product. In particular where the vinyl chloride sheet 12 is prepared by casting a vinyl chloride organisol or plastisol into a thin layer and subsequently heating the material sufficient to form a gelled layer but insufficient to decompose the chemical blowing agent therein, then the scrim material 36 may be applied to the top surface of the gelled layer while tacky and be bonded thereto prior to adding the layer 14.

FIGS. (i) and (j) illustrate another modification of my method wherein the sheet laminate 28 is subjected to heat from an infrared heater 32 on one surface thereof to a temperature sufficient to decompose the chemical blowing agent only in the lower portion of the sheet material 12 thereby producing a sheet laminate product as shown in FIG. 1(j). The lower portion of the product is cellular in nature because of the full decomposition of the chemical blowing agent in that particular layer, while the cellular nature of the sheet diminishes as you approach the interface between the top of sheet 12 and the non-woven layer 14. The partial decomposition technique is illustrated to provide a noncellular surface layer with an underlaying cellular layer and may be employed where for example it is desired that the non-woven fibers are more securely bonded; for example, where enhanced wear resistance is desired in the carpet.

FIG. 1(k) illustrates a carpet product produced by my method wherein and intervening layer of waste material 36 is employed in order to provide a greater fibrous depth to the carpet. In this method non-woven fibrous waste material generally of the same nature and kind as of the non-woven fibrous face material 14 which is generally virgin material (but the waste material can be different if desired) is placed on the sheet 12 such as by garnetting and thereafter, the face material 14 is garnetted thereon. Thereafter the operation is as set forth in FIGS. (a–g), but the product produced is that shown in FIG. 1(k) wherein the fibrous material 14 is needle punched together with the waste material 36 into layer 12 and the resulting cellular layer 34.

FIG. 1(l) illustrates a product produced when the sheet laminate 28 is employed as the base material 12 as shown in FIG. 1(a) and non-woven fibrous waste material 40 garnetted onto the opposite and other surface of the laminate 28 compressed and then needle punched into the thermoplastic sheet 12 and thereafter the sandwich-type laminate with non-woven fibrous materials on either side and secured to the base by needle punching otherwise bonded thereto and is then heated in a hot air oven to produce the cellular sheet product shown in FIG. 1(l). This product such as a carpet may be used wherein a sandwich laminate having a cellular interlayer is desired, this sheet laminate is also particularly desirable for use in garments as an insulating interliner or in carpets where there may be difficulty in directing bonding the cellular material 34 to a floor.

FIG. 1(n) illustrates a product produced by a modification of my method wherein the sheet material 12 employed contains a sheet material like paper or a woven fabric such as a fiberglass grid, resin reinforced paper sheet, etc., such as a scrim 36 within the sheet material 12. Such a product provides for increased strength and stability of the laminate. This product is prepared by laminating, usually by heat bonding, to thin sheet materials 12 together on opposite sides of the woven fabric 36 and using the sandwich layer as the sheet material 12 in FIG. (a).

FIG. 1(n) illustrates a product produced when the base 12 comprises a multi-layer vinyl resin sheet laminate wheren the upper layer 42 is a plasticized vinyl chloride resin sheet like 12, but absent any blowing agent and bonded to the gas-expandable layer 12 such as by heat sealing. The non-woven fabric is then needle punched directly into the layers 42 and 12. The layer 42 aids in bonding the fabric 14 into the layer since on subsequent heating it forms the cellular layer 34; the fibers in layer 42 are locked into place by the resin material.

FIG. 2 illustrates in block schematic form the steps required to produce an outdoor-indoor carpet in accordance with my invention. Although garnetting a fluffy non-woven layer of fibers onto the flowable thermoplastic sheet is a preferred method of operation, it is recognized as a part of this invention that any technique of applying, coating or placing non-woven fibers in a layer onto a sheet material may be employed and depending upon the character of the sheet, the step of compressing or compacting the fibers may not be required in all circumstances. The needle punching operation employed in my process is any technique by which the non-woven fibers are mechanically forced into the flexible polymeric sheet material so as to be retained therein and needle punching through the use of a plurality of needles operating in a rapid reciprocating manner substantially normal to the surface of the needle-punched fabric is the preferred method of proceeding although techniques embodying this general concept may be also employed. The heating of the needle-punched fiber sheet to form a cellular base need only be sufficient to decompose all or a part of the chemical blowing agent in the polymeric sheet material. Typical temperatures required for this operation are usually ranged from about 130° to 250° C.; for example, 170° to 210° C. However, the particular temperature and time required is dependent upon the chemical blowing agent employed. A wide variety of blowing agents may be employed, the particular blowing agent depending upon the type of cellular material desired in the polymer to be employed. Typical blowing agents are dinitrosopentamethyleneteramine, azodicarbonamide oxybis-(benzene sulfonyl)hydrazide. Other agents comprise solids and liquids such as carbonates, nitrites, hydrides, peroxides, urea, azo compounds, hydrazides, azides, nitroso compounds, halohydrocarbons like Freon, and the like, as more particularly set forth in the Encyclopedia of Polymer Science and Technology, vol. II, pp. 532-565, 1965.

My invention has been described in particular with the use of synthetic olefin resins employed as the non-woven face fibers in an indoor-outdoor carpet. However, depending upon the particular use of the ultimate product any natural or synthetic organic or inorganic fibrous material may be employed in the practice of my invention, such materials to include but not be limited to: natural materials such as cotton, wool, jute, hair and other cellulosic-type fibers and as well as inorganic fibers like asbestos, glass fibers, metals, metaloxides and the like, e.g. steel wool, glass wool, aluminum fibers. Typical synthetic fibers like organic synthetic fibers would include materials composed of olefinic resins, acrylates, polyesters like Dacron, polyamides like Nylon, rapon, polycarbonates like Lexan, and cellulosic fibers such as cellulose ethers and cellulose esters such as cellulose acetate, and the like and combinations thereof. Other synthetic material would include vinyl resins such as vinyl chloride resins as well as natural and synthetic elastomeric fibrous material.

My process has also been described in connection with the use of a vinyl chloride resin as the gas-expandable polymeric sheet material; however, any gas-expandable organo polymeric material may be employed as the sheet material containing the chemical blowing agent. Typical thermoplastic materials which may be employed include but are not limited to: vinyl resins including polyvinyl chloride and those obtained by copolymerizing vinyl chloride with other monomers such as with vinyl esters of short-chain fatty acids like vinyl acetate, maleates, vinylidene chloride and the like; olefinic resins such as polyethylene, polypropylene, copolymers of ethylene propylene, ethylene-butene, propylene-butene and ter-polymers thereof; as well as natural synthetic rubbery elastomeric material such as polybutadiene, polyisoprene, butyl rubber, styrene-acrylonitrile resins, nitrile rubbers and other materials capable of forming cellular material such as acrylate resins, urethane resins, phenolic resins, polyesters, polycarbonates, and the like.

Such polymeric sheets may typically contain a variety of modifying ingredients including fillers, pigments, dyes, detergents, antifoam agents, stabilizers, anti-oxidants, flock, plasticizers, softeners, processing aids, lubricants, initiators, accelerators, peroxides, curing agents, resins and the like. These materials may be formed into a sheet by calendering, casting, coating, extrusion or the like. The preferred polymeric materials are those that are compounded so as to be resilient and flexible so that during the needle punching operation the non-woven fibers will be bound therein upon the withdrawal of the needle, that is, compressed within the material by the plastic flow of the surrounding polymeric material. In the selection of the non-woven fibers and the sheet material to be employed in my invention, consideration should be given to the compatability of these materials and the adherence of the non-woven fabric in the material of the sheet, since where possible compatable material should be selected so that good bonding characteristics will be obtained; otherwise, tie coats or other means must be employed to permit the secure adhesion of the non-woven fibers to the cellular base. Accordingly, the use of vinyl chloride resins with wool, cotton and natural fiber is preferred, while the use of an olefinic resin sheet may be used with olefinic resins.

In a further embodiment of my method, an adhesive may be employed on the surface of the backing sheet, e.g. the gas-expandable resin layer or on the non-woven fibers or both in order to improve the bonding of the non-woven fibers after needle punching such as set forth more particularly in U.S. Pat. 1,978,620. For example the surface of the gas-expandable vinyl chloride resin sheet may have a thin adhesive layer applied thereto in any manner such as by coating, spraying and the like of a liquid vinyl chloride resin organosol or plastisol which may or may not contain a blowing agent, but which preferably fuses at or below the temperature at which the sheet is to be later expanded. If desired a vinyl chloride resin organosol or plastisol may be sprayed onto the non-woven fibers prior to the needle-punching operation. In this manner the plastisol or organosol will serve as an adhesive which on subsequent heating of the gas-expanding sheet will fuse and help to lock in the needle-punched non-woven fibers into the sheet. Typically the adhesive employed should be compatable with the material of the backing sheet. Where the gas-expandable resin sheet is an olefinic resin then a liquid melt of the same or a similar polymer or a solution suspension or emulsion of the polymer may be employed.

Having thus described my invention, what I claim is:
1. The method of preparing a non-oweven cellular sheet laminate which method comprises:
    (a) applying a layer of non-woven fibers onto the face surface of a sheet material comprising a gas-expandable thermoplastic resin sheet containing a blowing agent;
    (b) needle punching the non-woven fibers on the surface into the thermoplastic resin sheet thereby securing the non-woven fibers to the thermoplastic sheet; and
    (c) heating the back surface of the needle-punched non-woven thermoplastic sheet laminate to a temperature sufficient to decompose the chemical blowing agent only in the lower portion of the thermoplastic sheet so as to provide a cellular layer on the back surface and to maintain a noncellular layer on the face surface.

2. The method of claim 1 which includes garnetting overlapping layers of fluffy non-woven fibers onto a gas-expandable thermoplastic sheet to a desired depth; and compacting the fibers into a layer of desired density on the thermoplastic sheet.

3. The method of claim 1 which includes providing a woven fabric sheet on the surface of the thermoplastic sheet prior to applying the non-woven fiber layer.

4. The method of claim 1 wherein the thermoplastic sheet material contains therein a woven fabric sheet.

5. The method of claim 1 wherein the cellular layer formed is a substantially open cell.

6. The method of claim 1 wherein the thermoplastic sheet material comprises a plasticized sheet material of vinyl chloride resin or a $C_2$–$C_4$ olefin resin.

7. The method of claim 1 wherein the non-woven fibers comprise an olefinic resin.

8. The method of claim 1 wherein the resin sheet comprises a multilayer sheet the upper layer upon which surface the non-woven fibers are applied being non-gas expandable and the lower layer being gas expandable.

9. The method of claim 1 which includes heating the back surface of the needle-punched non-woven thermoplastic sheet laminate employing an infrared heater.

10. The method of claim 1 which includes heating only the back surface of the thermoplastic sheet laminate so as to provide for the full decomposition of the chemical blowing agent on the back surface, while the cellular nature of the sheet diminishes as it approaches the non-cellular face surface.

11. The method of claim 1 wherein the thermoplastic layer comprises a gas-expandable vinyl chloride resin sheet, the fibers are sprayed with a liquid vinyl chloride resin plastisol.

12. The method of claim 1 wherein the back surface of the sheet laminate is heated to a temperature less than the temperature at which the thermoplastic resin would flow about the fibers of the sheet, but sufficient to decompose the blowing agent in the lower portion of the sheet.

References Cited

UNITED STATES PATENTS

| | | | |
|---|---|---|---|
| 2,429,486 | 10/1947 | Reinhardt | 156—79 X |
| 2,948,650 | 8/1960 | Jackson et al. | 156—79 UX |
| 3,205,342 | 9/1965 | Smith et al. | 156—148 X |
| 2,972,554 | 2/1961 | Muskat et al. | 156—79 |
| 3,180,778 | 4/1965 | Rinderspacher et al. | 156—79 UX |
| 2,687,979 | 8/1954 | Talalay et al. | 159—79 X |

CARL D. QUARFORTH, Primary Examiner

P. A. NELSON, Assistant Examiner

U.S. Cl. X.R.

156—79, 148, 250, 303.1, 298